(12) United States Patent
Koseoglu et al.

(10) Patent No.: US 8,951,410 B2
(45) Date of Patent: *Feb. 10, 2015

(54) PROCESS FOR DEMETALLIZATION OF WHOLE CRUDE OIL

(75) Inventors: Omer Refa Koseoglu, Dhahran (SA);
 Adnan Al-Hajji, Dhahran (SA);
 Hendrik Muller, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 13/561,794

(22) Filed: Jul. 30, 2012

(65) Prior Publication Data

US 2013/0126395 A1 May 23, 2013

Related U.S. Application Data

(60) Continuation-in-part of application No. 12/658,660, filed on Feb. 9, 2010, which is a division of application No. 11/985,533, filed on Nov. 14, 2007, now Pat. No. 7,799,211.

(60) Provisional application No. 61/512,818, filed on Jul. 28, 2011.

(51) Int. Cl.
 *C10G 25/11* (2006.01)
 *C10G 25/12* (2006.01)
 *C10G 25/00* (2006.01)
 *C10G 25/05* (2006.01)
 *B01D 3/14* (2006.01)

(52) U.S. Cl.
 CPC .............. *C10G 25/11* (2013.01); *C10G 25/003* (2013.01); *C10G 25/05* (2013.01); *C10G 25/12* (2013.01); *B01D 3/143* (2013.01)
 USPC .... 208/302; 208/251 R; 208/305; 208/310 R; 208/347

(58) Field of Classification Search
 USPC ...................... 208/300, 302, 304, 305, 310 R
 See application file for complete search history.

(56) References Cited

U.S. PATENT DOCUMENTS

| 1,684,035 | A | * | 9/1928 | Kauffman et al. | ............ 208/296 |
| 1,788,654 | A | * | 1/1931 | Baylis | ............ 208/302 |
| 1,836,947 | A | * | 12/1931 | Zehrung | ............ 208/299 |
| 6,245,223 | B1 | * | 6/2001 | Gorbaty et al. | ............ 208/251 R |

OTHER PUBLICATIONS

Maples, Robert E., Petroleum Refinery Process Economics, 2nd Ed., 2000, Chapter 7: Crude Oil Processing (pp. 89-97).*

* cited by examiner

*Primary Examiner* — Renee E Robinson
(74) *Attorney, Agent, or Firm* — Abelman, Frayne & Schwab

(57) ABSTRACT

A crude oil feedstream is treated to remove or reduce the content of undesired metal components including nickel and/or vanadium by contacting the feedstream with one or more solid adsorbent materials selected from attapulgus clay, alumina, silica gel and activated carbon in a mixing vessel for a time that is sufficient to optimize the adsorption of the undesired metal components from the crude oil, subjecting the mixture to atmospheric flash distillation and then to vacuum flash distillation to recover presorted boiling ranges of products having a lowered content of the undesired metal components, and preferably regenerating at least a portion of the solid adsorbent material for reuse in the process.

14 Claims, 1 Drawing Sheet

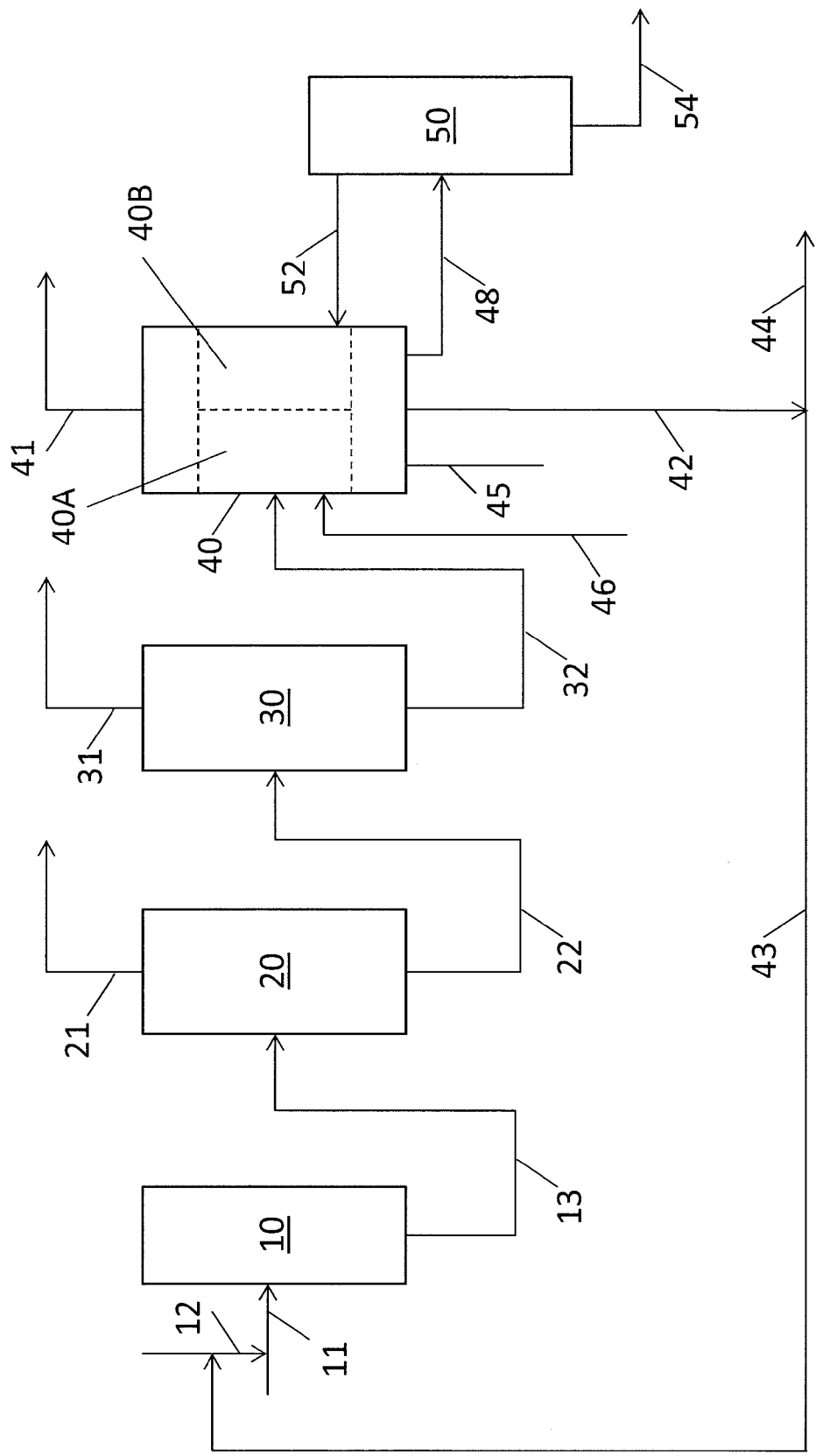

PROCESS FOR DEMETALLIZATION OF WHOLE CRUDE OIL

RELATED APPLICATIONS

This application claims the benefit of U.S. Provisional Patent Application No. 61/512,818 filed Jul. 28, 2011, and is a continuation-in-part of co-pending U.S. Ser. No. 12/658,660 filed Feb. 9, 2010, which is a divisional application of U.S. Ser. No. 11/985,533 filed Nov. 14, 2007, now U.S. Pat. No. 7,799,211, all of which are herein incorporated by reference in their entireties.

FIELD OF THE INVENTION

This invention relates to the treatment of a whole crude oil feedstream to remove undesired metal compounds in order to upgrade the crude oil and thereby enhance and render more efficient the downstream processing of the treated crude oil.

BACKGROUND OF THE INVENTION

Crude oil extracted from reservoir rock contains a number of undesired compounds, or contaminants. Crude oils contain heteroatom contaminants such as nickel, vanadium, sulfur, nitrogen, and others in quantities that can adversely impact the refinery processing of the crude oil fractions, e.g., by poisoning catalysts. Light crude oils or condensates contain such contaminants in concentrations as low as 0.01 W %. In contrast, heavy crude oils contain as much as 5-6 W %. The nitrogen content of crude oils can range from 0.001-1.0 W %. The heteroatom content of typical Arabian crude oils are listed in Table 1 from which it can be seen that the heteroatom content of the crude oils within the same family increases with decreasing API gravity, or increasing heaviness.

TABLE 1

| Property | ASL | AEL | AL | AM | AH |
|---|---|---|---|---|---|
| Gravity, ° | 51.4 | 39.5 | 33.0 | 31.1 | 27.6 |
| Sulfur, W % | 0.05 | 1.07 | 1.83 | 2.42 | 2.94 |
| Nitrogen, ppmw | 70 | 446 | 1064 | 1417 | 1651 |
| RCR, W % | 0.51 | 1.72 | 3.87 | 5.27 | 7.62 |
| Ni + V, ppmw | <0.1 | 2.9 | 21 | 34.0 | 67 |

The following abbreviations are used in Table 1: ASL—Arab Super Light; AEL—Arab Extra Light; AL—Arab Light; AM—Arab Medium and AH—Arab Heavy; W % is percent by weight; ppmw is parts per million by weight.

The metal distribution of the Arab light crude oil fractions are given in Table 2.

TABLE 2

| Whole Crude Oil Boiling Temp. | Vanadium, ppmw | Nickel, ppmw |
|---|---|---|
|  | 16 | 4 |
| 204° C.+ | 18 | 5 |
| 260° C.+ | 19 | 5 |
| 316° C.+ | 30 | 9 |
| 371° C.+ | 36 | 10 |
| 427° C.+ | 43 | 12 |
| 482° C.+ | 57 | 17 |

These metals are in the heavy fraction of the crude oil, which is commonly used as a fuel oil component. The metals must be removed during the refining operations to meet the fuel burner specifications.

In a typical petroleum refinery, crude oil is first fractionated in an atmospheric distillation column to separate and recover sour gas and light hydrocarbons, including methane, ethane, propane, butanes and hydrogen sulfide, naphtha (36-180° C.), kerosene (180-240° C.), gas oil (240-370° C.), and atmospheric residue, which is the remaining hydrocarbon fraction boiling above 370° C. The atmospheric residue from the atmospheric distillation column is typically used either as fuel oil or sent to a vacuum distillation unit, depending on the configuration of the refinery. The principal products of vacuum distillation are vacuum gas oil, being hydrocarbons boiling in the range 370-520° C., and vacuum residue consisting of hydrocarbons boiling above 520° C. The metals in the crude oil fractions impact these distillation processes, and other downstream process including hydrotreating, hydrocracking and FCC.

Naphtha, kerosene and gas oil streams derived from crude oils or from other natural sources such as shale oils, bitumens and tar sands, are treated to remove the contaminants, e.g., mainly sulfur, whose quantity exceeds the specifications. Hydrotreating is the most common refining process technology employed to remove the contaminants. Vacuum gas oil is typically processed in a hydrocracking unit to produce gasoline and diesel or in a fluid catalytic cracking unit to produce gasoline, with LCO and HCO as by-products. The LCO is typically used either as a blending component in a diesel pool or as fuel oil, while the HCO is typically sent directly to the fuel oil pool. There are several processing options for the vacuum residue fraction, including hydroprocessing, coking, visbreaking, gasification and solvent deasphalting.

Processes have been disclosed employing solid adsorbent materials for use in treating hydrocarbon feedstreams to remove undesired compounds, including nitrogen and sulfur-containing compounds. For example, U.S. Pat. No. 4,846,962 discloses a process for selectively removing basic nitrogen compounds from solvent extracted oils by their absorption a solid acidic polar-adsorbent material. Following the solvent extraction process, the basic nitrogen compounds present with the desired oil fraction are contacted with adsorbents of the silica-alumina type, Ketjen high-alumina base (amorphous) and H—Y zeolite (crystalline) identified as being preferred. In addition, various treatments were applied to the adsorbents to improve their effectiveness. It was also disclosed that the adsorbents could be regenerated, e.g., by purging with a hot hydrogen gas stream.

In the process described in U.S. Pat. No. 5,843,300, organic sulfur compounds, especially aromatic sulfur compounds, are removed from an FCC feedstream with minimal adsorbtion of aromatic hydrocarbons using a zeolite X exchanged with alkali or alkaline earth cations, with KX being an especially effective adsorbent. It was also indicated that the adsorbent could be regenerated by contact with a heated stream of hydrogen. The use of the process in treating FCC feedstocks having particular classes of sulfur-containing materials was disclosed as particularly effective.

A process is disclosed in U.S. Pat. No. 6,248,230 for improving the efficiency of hydrodesulfurization processes by first extracting natural polar compounds from a distillate feedstream. The improvement was based upon the stated finding that even small quantities of natural polar compounds have a significant negative effect upon the hydrodesulfurization process in the deep desulfurization zone. The natural polar compounds include nitrogen and sulfur-containing compounds having a relatively higher polarity than that of dibenzothiophene. Adsorbents include activated alumina, acid white clay, Fuller's earth, activated carbon, zeolite, hydrated alumina, silica gel, ion exchange resin, and their combinations. In the process disclosed, the treated feedstream is catalytically hydroprocessed to produce a hydrocarbon fuel.

Reduction in the amount of sulfur compounds in transportation fuels and other refined hydrocarbons is required in order to meet environmental concerns and regulations. Removal of contaminants depends on their molecular characteristics; therefore, detailed knowledge of the sulfur species in the feedstock and products is important for the optimization of any desulfurization process. Numerous analytical tools have been employed for sulfur compounds speciation. Gas chromatography (GC) with sulfur-specific detectors is routinely applied for crude oil fractions boiling up to 370° C. The use of ultra-high resolution Fourier transform ion cyclotron resonance (FT-ICR) mass spectrometry has recently been advanced as a powerful technique for the analysis of heavy petroleum fractions and whole crude oils. Use of this methodology is described in (1) Hughey. C. A., Rodgers, R. P., Marshall, A. G., Anal. Chem. 2002, 74, 4145-4149; (2) Muller, H., Schrader, W., Andersson, J. T., Anal. Chem., 2005; 77, 2536-25431 and (3) Choudhary, T. V. Malandra, J., Green J., Parrott, S., Johnson, B., Angew. Chem., Int. Ed. 2006, 45, 3299-3303.

Two ionization analytical methods that have been successfully employed in the analysis for aromatic sulfur and polar nitrogen petroleum components are electrospray ionization (ESI) and atmospheric pressure photo ionization (APPI). Both are well known analytical methods and the apparatus for their practice are commercially available.

From the above discussion, it is apparent that it would be desirable to upgrade crude oil by removing specific undesirable compounds at an early stage of processing so that the fractions subsequently recovered are free of these compounds.

It is therefore a principal object of the present invention to provide a novel method of treating crude oil to substantially reduce the content of undesired metal compounds.

Another object of the invention is to provide a method of removing undesired metal compounds, primarily Nickel and Vanadium, from crude oil that requires a relatively low capital investment for equipment and that is economical to operate.

SUMMARY OF THE INVENTION

The present invention broadly comprehends a process for demetallizing whole crude oil by contacting the whole crude oil with one or more solid adsorbent materials in a mixing vessel for a time that is sufficient to optimize the adsorption of the undesired metal compounds from the crude oil. Adsorbents can be selected from one or more of attapulgus clay, alumina, silica gel and activated carbon. Other suitable adsorbent materials include clays, synthetic zeolite, spent or regenerated or rejuvenated refinery catalysts, titania, and mixtures thereof, porous ion-exchange resins and any material exhibiting a propensity to adsorb metal poryphyrins or metals, i.e., materials that are neutral to acidic sites. The demetallized crude oil can be sold as a low-metals content crude oil or processed in a conventional refinery. The remaining heavy crude oil fraction containing the metals can be processed in a refinery equipped with a coking unit and/or gasification processes.

This invention utilizes solid adsorbent particles to remove predetermined metal contaminants from the crude oil feedstream. The process steps can be easily controlled, and the equipment used is conventional and can be installed in an oil field production center or in refineries as a pretreatment process. The solid particles are selected to have sufficient surface area, pore volume and pore size to adsorb the metal compounds. The metal contaminants are selectively removed from the crude oil using solid adsorbent particles which have a surface area of at least 100 $m^2/g$, pore size of at least 10° A and a pore volume of 0.1 cc/g.

The present invention is thus directed to a process for upgrading crude oil to reduce the content of undesired known metal compounds that comprises:

a. mixing the crude oil with at least one solid adsorbent material that is an absorbent for the metal compounds for a sufficient time and under conditions to adsorb the undesired compounds;

b. subjecting the mixture containing the solid adsorbent material to atmospheric flash distillation and separating and removing the distillates having an initial boiling point of 36° C. and a final boiling point between 350° C. and 400° C.;

c. transferring the bottoms from the atmospheric distillation of step (b) to a vacuum flash distillation vessel and subjecting the mixture to vacuum flash distillation, and separating and removing the distillates having an initial boiling point between 350° C. and 480° C. and a final boiling point between 480° C. and 560° C.;

d. recovering and regenerating at least a portion of the adsorbent material contained in the bottoms from the vacuum distillation vessel; and e. recovering and returning the regenerated adsorbent material for re-use in step (a).

In a preferred embodiment, the process preliminarily includes the steps of analyzing a sample of the crude oil to be treated in order to identify undesired compounds present and their relative concentrations, and selecting one or more adsorbent materials based upon the ability of each of the one or more adsorbent materials to adsorb the undesired metal compounds found by testing to be present in the crude oil, and providing sufficient amounts of the adsorbent(s) in order to reduce the contaminant(s) to a predetermined desired level.

The crude oil and solid adsorbent(s) is preferably mixed in a vessel that is maintained at a temperature that is between 20° C. and 200° C. and a pressure in the range of from 1 to 100 $kg/cm^2$ and preferably at 1 to 10 $kg/cm^2$.

The mixing vessel can be selected from various types including a stirred-tank, an ebullated-bed reactor, a moving-bed reactor, a baffled slurry tank, a fixed bed and a rotating tubular reactor. The process is preferably operated in a continuous mode.

In an embodiment, the adsorbent material in the bottoms recovered from the vacuum distillation step is regenerated utilizing a solvent regeneration process in which one or a plurality of solvents having varying polarity are selected for the regeneration of the adsorbent(s) based on their Hildebrand solubility, and up to 90% of the absorbent material after regeneration is recovered and recycled for use in mixing with the crude oil.

BRIEF DESCRIPTION OF THE DRAWING

The invention will be further described below in conjunction with the attached drawing which is a schematic illustration of a process and apparatus suitable for practicing the process.

DETAILED DESCRIPTION OF THE INVENTION

Referring now to the drawing, there is schematically illustrated an embodiment suitable for practicing the invention that includes five vessels that are sequentially arranged and each is referred to by its general function as contacting vessel 10, atmospheric flash separator vessel 20, vacuum flash separator vessel 30, filtration/regeneration vessel 40, and solvent treatment vessel 50.

In a particularly preferred embodiment, all of the vessels are operated as components in a continuous process. The crude oil feedstream 11 and the solid adsorbent 12 are fed to the contacting vessel 10 and mixed to form a slurry. The contacting vessel 10 can be operated as an ebullient bed or fixed-bed reactor, a tubular reactor or a continuous stirred-tank reactor. The slurry can be passed through a series of baffles to insure adequate mixing and residence time and collected via an overflow channel or an outlet at the end of the vessel opposite from where the crude oil and adsorbent are admitted.

The solid adsorbent/crude oil slurry mixture 13 is then transferred to the atmospheric flash separator 20 to separate and recover the atmospheric distillates 21. The atmospheric residue bottoms stream 22 from vessel 20 is sent to the vacuum flash separator vessel 30. The vacuum distillates stream 31 is withdrawn from the top of vessel 30 and the bottoms 32 containing the vacuum flash residue and solid adsorbent are sent to the solvent adsorbent regeneration unit vessel 40. The vacuum residue product 41 is withdrawn from the top of vessel 40 and the bottoms 42 are removed and separated, and the reusable regenerated adsorbents 43 are recycled back and introduced with a portion of fresh feed 12 into vessel 10; a remaining portion 44 of the regenerated adsorbent is removed for disposal.

In a particularly preferred embodiment, the adsorbent regeneration unit 40 is operated in swing mode with parallel units 40A and 40B so that production of the regenerated absorbent is continuous. When the adsorbent material in stream 32 from vacuum distillation unit 30 that is introduced into one regeneration unit, e.g., column 40A, reaches capacity, the flow of feedstream 32 is directed to column 40B. The adsorbed compounds are desorbed by heat or solvent treatment. The nitrogen- and PNA-containing adsorbed compounds can be desorbed by either applying heat with an inert nitrogen gas stream 45 at a pressure of from 1-10 Kg/cm, or by desorption with an available fresh solvent stream 46 or recycled stream 52, or a refinery stream, such as naphtha, diesel, toluene, acetone, methylene chloride, xylene, benzene or tetrahydrofuran in the temperature range of from 20° C. to 250° C.

In the case of heat desorption, the desorbed compounds are removed from the bottom of the column as stream 48 for use in other refinery processes, such as residue upgrading facilities, including hydroprocessing, coking and the asphalt plant, or they can used directly in fuel oil blending.

In a solvent desorption process, the solvents are selected based on their Hildebrand solubility factors or by their two-dimensional solubility factors. The overall Hildebrand solubility parameter is a well-known measure of polarity and has been calculated for numerous compounds. See, for example, Journal of Paint Technology, vol. 39, no. 505 (February 1967). Appropriate solvents can also be described by their two-dimensional solubility parameter comprised of the complexing solubility parameter and the field force solubility parameter. See, for example, I. A. Wiehe, Ind & Eng. Res., 34 (1995), 661. The complexing solubility parameter component, which describes the hydrogen bonding and electron donor-acceptor interactions, measures the interaction energy that requires a specific orientation between an atom of one molecule and a second atom of a different molecule. The field force solubility parameter, which describes the van der Waals and dipole interactions, measures the interaction energy of the liquid that is not destroyed by changes in the orientation of the molecules.

In accordance with this invention the non-polar solvent, or solvents, if more than one is employed, preferably have an overall Hildebrand solubility parameter of less than about 8.0 or the complexing solubility parameter of less than 0.5 and a field force parameter of less than 7.5. Suitable non-polar solvents include, e.g., saturated aliphatic hydrocarbons such as pentanes, hexanes, heptanes, parafinic naphthas, $C_5$-$C_{11}$, kerosene $C_{12}$-$C_{15}$, diesel $C_{14}$-$C_{20}$, normal and branched paraffins, mixtures of any of these solvents. The preferred solvents are $C_5$-$C_7$ paraffins and $C_5$-$C_{11}$ parafinic naphthas.

In accordance with this invention, the polar solvent(s) have an overall solubility parameter greater than about 8.5 or a complexing solubility parameter of greater than 1 and field force parameter of greater than 8 Examples of polar solvents meeting the desired minimum solubility parameter are toluene (8.91), benzene (9.15), xylenes (8.85), and tetrahydrofuran (9.52). The preferred polar solvents used in the examples that follow are toluene and tetrahydrofuran.

In the case of solvent desorption, the solvent and rejected stream from the adsorbent tower is sent to a fractionation unit 50 within the battery limits of the unit operation. The recovered solvent stream 52 is recycled to the adsorbent regeneration unit 40, or 40A and 40B, for reuse. The bottoms stream 54 from fractionation unit 50 can be sent to other refinery processes.

In accordance with the process of the invention, the crude oil is pretreated by contacting the oil with one or more solid adsorbents. The contaminants that are detrimental in the downstream refining processes are separated in this initial process and will result in increasing the improved efficiency of the subsequent downstream refinery processing units. In a preferred embodiment of the practice of the adsorptive demetallization of the invention, the crude oil is first subjected to a stabilization processing step.

EXAMPLE

A heavy crude oil containing 84.6 W % carbon, 12 W % of hydrogen, 3.27 W % sulfur and 0.25 W % nitrogen was contacted with attapulgus clay in a vessel simulating a slurry column at 40° C. for 30 minutes. The slurry mixture was then filtered and the solid mixture was washed with a straight run naphtha stream boiling in the range 36-180° C. containing 97 W % paraffins, the rest being aromatics and naphtenes at 1:5 V:V oil-to-solvent ratio. After fractionation of the naphtha stream, 90.5 W % of the product was collected. The adsorbent-treated product contained 53 ppmw total metals (Ni+V, a total of 23 W % decrease), 3.00 W % sulfur (8 W % decrease) and 1445 ppmw nitrogen (42 W % decrease). The adsorbent was further washed with toluene and tetrahydrofuran at 1:5 V:V solid-to-solvent ratio and 7.2 W % and 2.3 W %, respectively, of reject fractions were obtained. The material balance of the upgrading process and the elemental compositions for the feed stock and products are reported in Table 3.

TABLE 3

| | Fraction | | | | | | | |
|---|---|---|---|---|---|---|---|---|
| | Mass, % | C, W % | H, W % | S, W % | N, W % | Ni, ppmw | V, ppmw | Ni—V, ppmw |
| Crude Oil | 100.0 | 84.6 | 12.0 | 3.3 | 0.3 | 18.0 | 51.0 | 69.0 |

TABLE 3-continued

| | | | | | | | | |
|---|---|---|---|---|---|---|---|---|
| Upgraded Crude Oil | 90.5 | 84.7 | 12.2 | 3.0 | 0.1 | 14.7 | 38.4 | 53.1 |
| Residue | 9.5 | 84.2 | 10.0 | 5.1 | 0.7 | 34.3 | 132.3 | 166.6 |
| Material Balance | 100.0 | 100.1 | 100.2 | 98.5 | 78.2 | | | |
| Residue 1 | 7.2 | | | | | 30.0 | 97.3 | 127.3 |
| Residue 1 | 2.3 | | | | | 48.0 | 242.0 | 290.0 |
| De-metallization, W % | | | | | | 18.2 | 24.7 | 23.0 |

| Sample description | Nickel in PPM | Vanadium in PPM |
|---|---|---|
| IP-100-01-3, THE WASH | 48 | 241.97 |
| IP-100-01-02, Toluene Wash | 30.0 | 97.30 |
| IP-100-09-01, Jun. 19, 2007 | 43.30 | 126.20 |

We claim:

1. A method for upgrading crude oil to reduce the content of undesired metal components including nickel and/or vanadium that comprises:
   a. mixing the crude oil with solid adsorbent particles that is an absorbent for the metal components for a sufficient time and under conditions to adsorb the undesired metal components to produce a mixture of crude oil and solid adsorbent material;
   b. subjecting the mixture produced in step (a) to atmospheric flash distillation and separating and removing distillates having an initial boiling point of 36° C. and a final boiling point between 350° C. and 400° C.;
   c. transferring bottoms from the atmospheric distillation of step (b) to a vacuum flash distillation vessel and subjecting the bottoms from the atmospheric distillation to vacuum flash distillation, and separating and removing distillates having an initial boiling point between 350° C. and 480° C. and a final boiling point between 480° C. and 560° C.;
   d. regenerating at least a portion of the solid adsorbent particles contained in the bottoms from the vacuum distillation vessel; and
   e. recovering and returning the regenerated solid adsorbent particles for re-use in step (a).

2. The method of claim 1 which includes the step of analyzing a sample of the crude oil to identify the undesired metal components present and selecting the solid adsorbent particles based upon their ability to adsorb the undesired metal components known to be present in the crude oil.

3. The method of claim 1 in which the solid adsorbent particles are selected from attapulgus clay, alumina, silica gel and activated carbon.

4. The method of claim 1 in which the temperature of the mixture in step (a) is between 20° C. and 200° C.

5. The method of claim 1 in which the mixing in step (a) occurs in a vessel maintained at a pressure in the range of from 1 to 100 kg/cm$^2$.

6. The method of claim 1 which is continuous.

7. The method of claim 1 in which the mixing of step (a) occurs in a vessel selected from a stirred-tank, an ebullient-bed reactor, a baffled slurry tank, a fixed bed and a rotating tubular reactor.

8. The method of claim 1 in which the solid adsorbent particles are regenerated in step (d) utilizing a solvent regeneration process.

9. The method of claim 8 in which a plurality of solvents having varying polarity are selected for the regeneration based on their Hildebrand solubility.

10. The method of claim 8, wherein step (d) comprises desorption with a fresh or recycled solvent stream at a temperature range of from 20° C. to 250° C.

11. The method of claim 8, wherein step (d) comprises desorption with a refinery stream at a temperature range of from 20° C. to 250° C., the refinery stream selected from the group consisting of naphtha, diesel, toluene, acetone, methylene chloride, xylene, benzene and tetrahydrofuran.

12. The method of claim 1 in which up to 90% of the solid adsorbent particles subjected to regeneration in step (d) is recovered and recycled for use in step (a).

13. The method of claim 1, wherein step (d) comprises applying heat with an inert nitrogen gas flow at a pressure in the range of from 1 to 10 kg/cm$^2$.

14. The method of claim 1, wherein step (d) occurs in a adsorbent regeneration unit that is operated in swing mode.

* * * * *